Dec. 15, 1970    C. W. GRENNAN ET AL    3,547,557

FLUID PUMP AND DELIVERY SYSTEM

Filed Oct. 14, 1968    2 Sheets-Sheet 1

INVENTORS
CHARLES W. GRENNAN
RICHARD J. HEARN
BY Fishman + Van Kirk
ATTORNEY

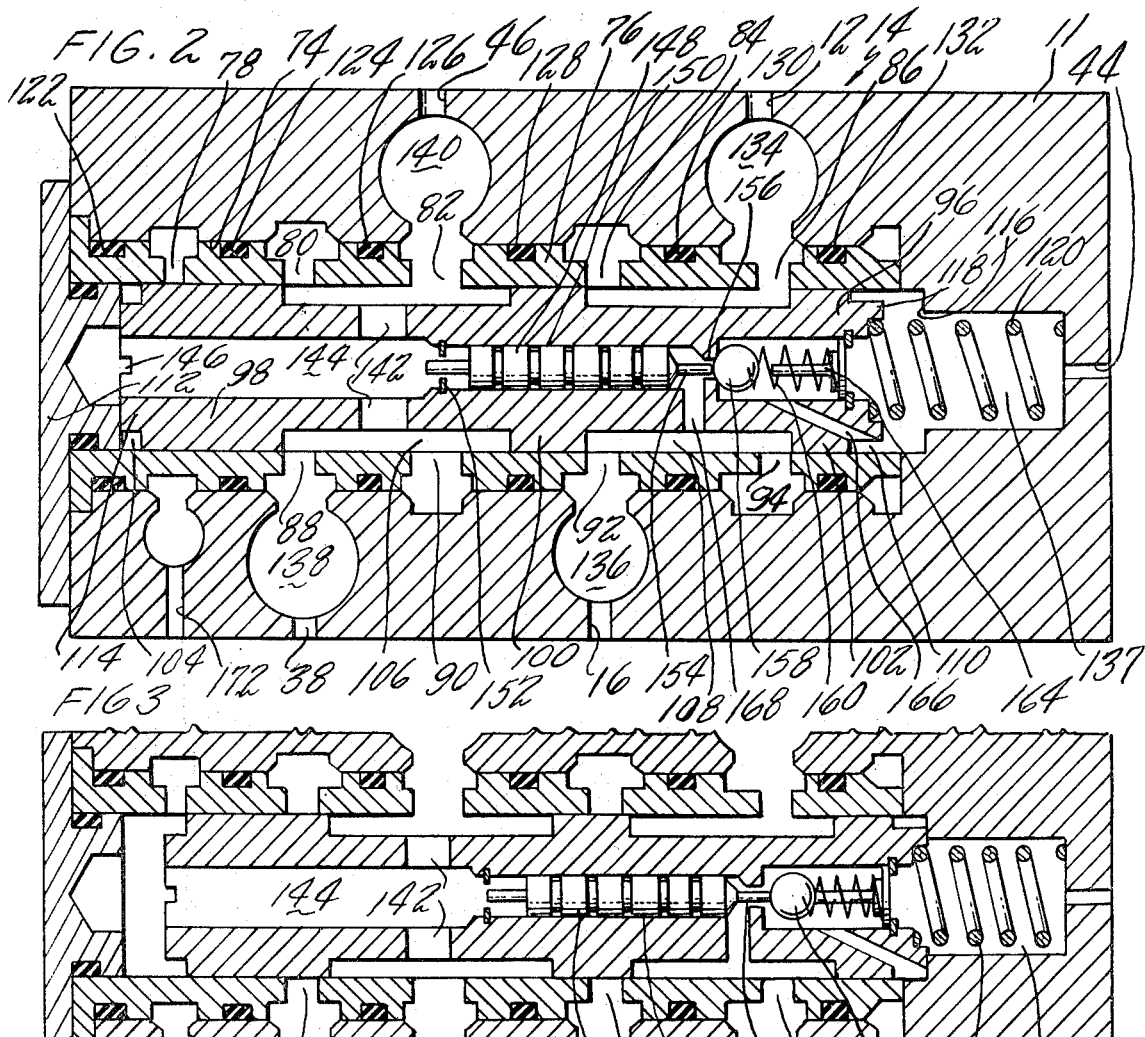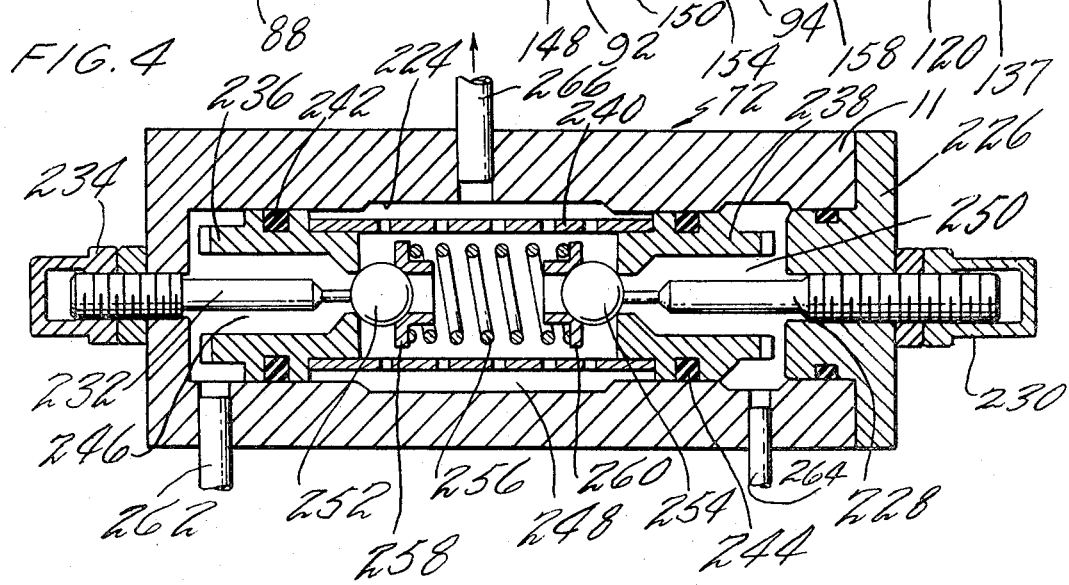

United States Patent Office 3,547,557
Patented Dec. 15, 1970

3,547,557
FLUID PUMP AND DELIVERY SYSTEM
Charles W. Grennan, Newington, and Richard J. Hearn, New Hartford, Conn., assignors to Chandler Evans Inc., West Hartford, Conn., a corporation of Delaware
Filed Oct. 14, 1968, Ser. No. 767,293
Int. Cl. F04b 23/14, 49/00
U.S. Cl. 417—89                         27 Claims

ABSTRACT OF THE DISCLOSURE

A fuel pump and delivery system for gas turbine engines is disclosed having a plurality of interrelated pumping circuits to meet the engine fuel requirements over the entire range of engine operation. The system has three distinct but interrelated circuits for (1 start-up and low-speed operating requirements, (2) normal operating requirements above engine idle speed, and (3) high altitude cruise requirements. A positive displacement gear pump functions in the low speed and start-up circuit to provide the necessary dry lift and high pressure, and after the start-up requirements have been met, this part of the displacement gear pump is unloaded to terminate its pumping action, but the gear train is employed to drive selectively operative centrifugal pumps of different capacities suitable to meet the engine fuel requirements for either normal operations or for high altitude cruise.

BACKGROUND OF THE INVENTION

Field of the invention

This invention relates to fluid pumping systems. More particularly, the present invention is directed to the field of gas turbine engine, particularly aircraft gas turbine engine, fuel pumping and delivery systems. Thus, in its principal application, this invention is an improved multi-circuit fuel pumping and delivery system for aircraft gas turbine engines whereby the widely varying requirements for engine start up, normal operation, and high altitude cruise are optimumly met.

DESCRIPTION OF THE PRIOR ART

Aircraft gas turbine engines require fuel pumps that can provide dry lift and high output pressure to meet engine start up and low speed requirements. Positive displacement pumps, especially gear-type positive displacement pumps, have been employed to meet these dry lift and high pressure starting requirements. However, recent development of high-speed auxiliary equipment (such as fuel controls) for modern high-efficiency engines either precludes, or make highly undesirable, the use of positive displacement pumps throughout the entire range of engine operation. This undesirability results from the large power losses and temperature rises caused by high bypass flows associated with positive displacement pumps and also the fluid and mechanical friction inherent in flooded high-speed machinery such as positive displacement pumps.

SUMMARY OF THE INVENTION

In the present invention a plurality of distinct but inter-related pumping circuits are employed to meet engine fuel delivery requirements over the entire range of engine operation. Specifically, three circuits are employed for (1) start up and low-speed operations, (2) normal operation, and (3) high altitude cruise operation. However, it will be understood that circuits could be rescheduled, added or deleted within the scope and spirit of the present invention if desired.

The first circuit, for engine start up and low-speed operation, employs a gear-type positive displacement pump to provide the necessary dry lift and high pressure, low speed capabilities needed for start up. When the normal operating range of the engine is reached, the first circuit is deactivated and a second circuit, designed for normal operating requirements of the engine, is activated. The second circuit includes a high flow centrifugal pump to provide the necessary fuel flow to the engine. When high altitude cruise conditions are encountered, the second circuit is deactivated and a third circuit having a low flow centrifugal pump is activated to supply fuel to the engine to meet the high altitude cruise requirements.

As stated, the positive displacement pump in the first circuit is a gear-type pump; however, the gears of this pump are of different diameter. The gear pump is of the sealing block type, and upon deactivation of the first circuit the sealing block is disengaged to unload the pump. Thereafter, the gears of the pump are used to drive elements for the centrifugal pumps in the second and third circuits. The centrifugal pump in the second circuit is preferably a two-stage pump, and the centrifugal pump in the third stage is preferably a vapor core pump with an axial inducer. Upon deactivation of the first circuit, the cavity of the gear pump is drained by an eductor to reduce the friction inherently encountered in flooded high-speed machinery, and thereafter a fuel spray is provided to lubricate the gears. To insure power conservation, back filling from the common discharge of these elements is prohibited through use of check valves and the centrifugal pumps contain pressure activated drain valves which allow the aforementioned eductor to evacuate the deactivated centrifugal stage.

Accordingly, one object of the present invention is to provide a novel and improved fluid pumping and delivery system.

Another object of the present invention is to provide a novel and improved fuel pump and delivery system for gas turbine engines, especially aircraft gas turbine engines.

Still another object of the present invention is to provide a novel and improved multicircuit fuel pump and delivery system for gas turbine engines.

Still another object of the present invention is to provide a novel multicircuit pump and delivery system for gas turbine engines wherein at least one circuit has a positive displacement type pump and at least one circuit has a centrifugal type pump.

Still another object of the present invention is to provide a novel and improved multicircuit pump and delivery system for aircraft gas turbine engines, including a first circuit for engine start up and low-speed operation, a second circuit for the normal range of engine operation, and a third circuit for high altitude cruise operation.

Other objects and advantages of the present invention will be apparent and understood from the following detailed description and drawings.

BRIEF DESCRIPTION OF THE DRAWING

In the drawing, wherein like elements are numbered alike in the several figures:

FIG. 2 is an enlarged, sectional detailed view of the selector valve of the embodiment of FIG. 1.

FIG. 3 is a partial view of the valve element of FIG. 2 showing parts actuated to assume different relative positions.

FIG. 4 is an enlarged detailed sectional view of the drain valve of the embodiment of FIG. 1

DESCRIPTION OF THE PREFERRED EMBODIMENT

Figure 1:
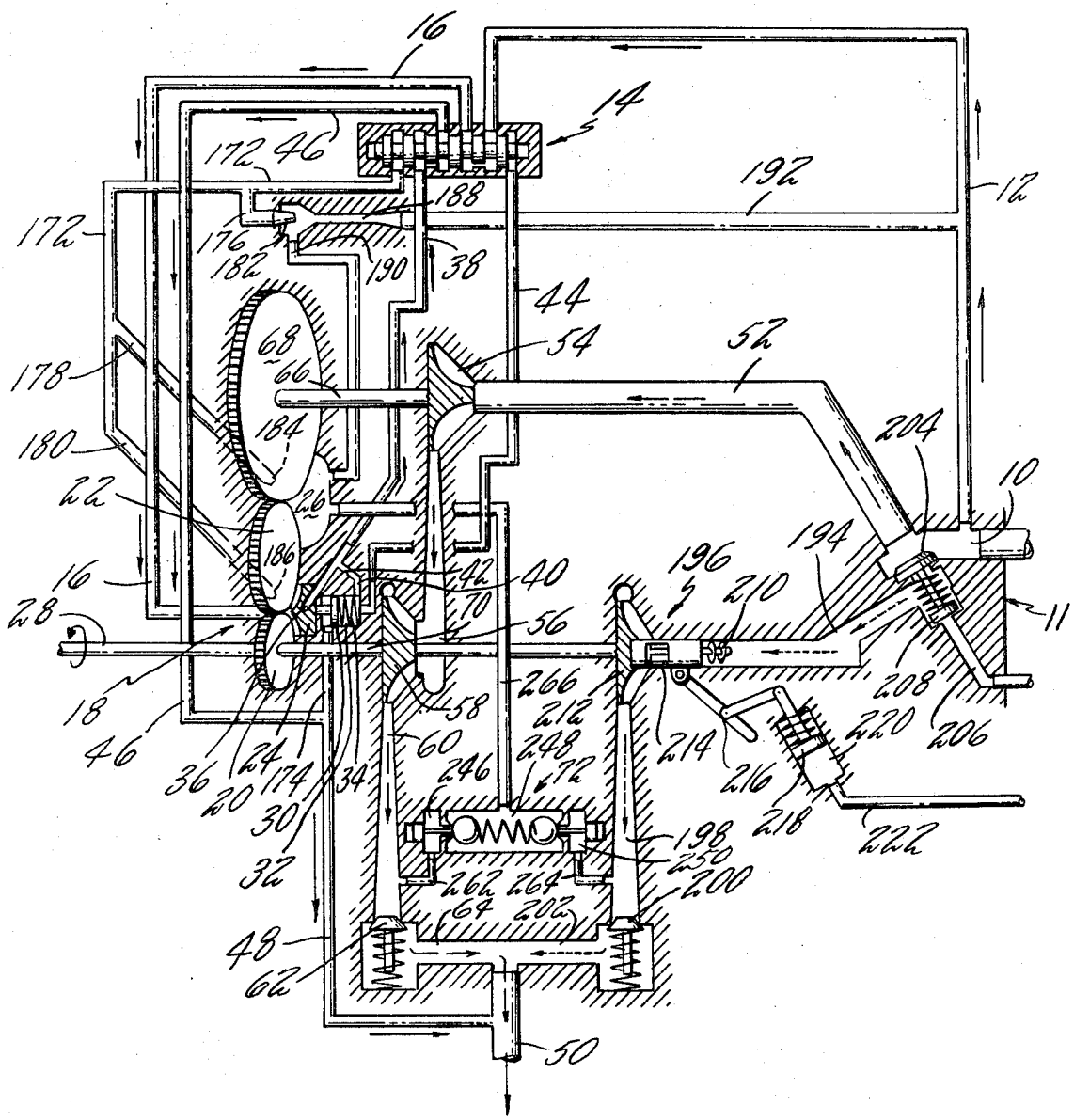
FIG. 1 is a semi-schematic view of a preferred embodiment of a multicircuit pump and delivery system in accordance with the present invention.

Referring now to FIG. 1, fuel enters at inlet 10 and flows via conduit 12 to a selector valve 14. Flow through conduit 12 is indicated by the arrows within the conduit, and it will be understood that such arrows in any of the conduits of FIG. 1. indicate the direction of fuel flow therein when fuel is flowing in that conduit. At engine start up transfer valve 14 is positioned so that conduit 16 is connected to and is in flow communication with conduit 12 via connecting passages in transfer valve 14. The details of transfer valve 14 will be described hereinafter with reference to FIG. 2, but for the purposes of the immediate description it is sufficient to state that the fuel flowing in conduit 12 is delivered via transfer valve 14 into conduit 16. The fuel is then delivered via conduit 16 to the inlet of a positive displacement gear pump indicated generally at 18.

Positive displacement gear pump 18 is a sealing block-type pump of the type known in the art and such as is shown in United States Letters Patent to Oshei, No. 2,105,259, and Kosch, No. 3,208,393. Sealing block pump 18 is indicated only schematically in FIG. 1, but it will be understood that the pump is in a suitable housing or cavity and incorporates all of the necessary structure to constitute a sealing block pump such as is disclosed in the referenced patents. Pump 18 includes meshing gears 20 and 22 and wear or sealing block 24, the sealing block being indicated schematically. It will be understood that gears 20 and 22 are depicted partly in perspective to show the cooperation or interaction between the gears and sealing block 24, the gears actually being housed in a suitable cavity or recess 26 in a housing structure. Obviously, the elements depicted in FIG. 1 could be contained within a single housing or could be contained in separate housings and connected together for flow purposes. Gears 20 and 22 are of dissimilar diameter with gear 22 being of larger diameter than gear 20, and sealing block 24 is contoured to simultaneously confront and cooperate with the tooth tips of gears 20 and 22 and to cooperate with side plates (not shown) of the sealing block pump mechanism in sealing engagement with side portions of the gears and sealing block in known fashion to create a region of high fluid pressure in the area of meshing contact between gears 20 and 22 when the gears are caused to rotate. Gears 20 and 22 are mounted on suitable bearings (not shown) for rotation, and gear 20 is connected to shaft 28 which rotates in the direction indicated by the arrow at the left end thereof to provide the rotational drive for pump 18. Shaft 28 would ordinarily be a power take off from the engine to which the fuel is being pumped.

A piston 30 is directly connected to sealing block 24 and is axially slidable in a bore 32. Spring 34 loads piston 30 to the left, as indicated in FIG. 1, to urge sealing block 34 into engaging and pressuring contact with gears 20 and 22. The fuel flowing in conduit 16 and delivered to gear pump 18 is thus pressurized for delivery to the engine. The pressurized fuel is discharged via an opening in sealing block 24, indicated schematically at 36, and flows through a conduit 38 to another section of selector valve 14. A branch conduit 40 having a fixed restriction 42 therein extends from conduit 38 to bore 32 behind piston 30 so that pressurized fluid is introduced behind piston 30 to assist spring 34 in loading sealing block 24 against the gears. Another conduit 44 also extends from bore 32 to still another part of selector valve 14 so that branch conduit 40 also communicates with selector valve 14.

The pressurized fuel in conduit 38 is delivered, via transfer passages in selector valve 14 to a conduit 46 which in turn has a branch conduit 48 leading to a discharge port 50 which is connected to the engine main fuel control. Thus, the pressurized fuel in conduit 48 is delivered to the main fuel control for eventual metered delivery to the engine.

The fluid flow circuit just described, including conduit 12, the connections through selector valve 14, conduit 16, pump 18, conduit 38, the transfer connection through selector valve 14, conduit 46, conduit 48 and discharge port 50 constitute the first flow circuit whereby fuel is delivered to the engine fuel control at start up and during low-speed operation, the first circuit taking advantage of the dry life and high pressure capabilities of positive displacement gear pump 18.

Returning again to inlet 10 to the system casing or envelope 11, it can be seen that another conduit 52 is also connected to inlet 10. Conduit 52 provides communication between inlet 10 and the inlet to a centrifugal inducer impeller pump 54. The discharge from pump 54 leads, via a conduit 56, to the inlet of a centrifugal impeller pump 58. The discharge from impeller pump 58 leads, via a conduit 60, to a spring loaded check valve 62 located at the juncture between conduit 60 and a branch conduit 64, conduit 64 in turn being connected to discharge port 50. The spring loading on check valve 62 urges it to a position to close off conduit 60 from conduit 64, and it can also be seen that the backside of check valve 62 is exposed to discharge pressure in conduit 48 and at discharge 50 to assist in urging check valve 62 to the closed position.

The impeller of pump 54 is drivingly connected by a shaft 66 to a gear 68 which serves as the input drive to pump 54. Gear 68 meshes with gear 22 of gear pump 18 and is larger than gear 22 which, as noted above, is larger than gear 20. Thus, as well as serving as a gear pump, gears 20 and 22 also serve as part of a gear train drive along with gear 68 of pump 54, gear 22 acting as an idler gear in the gear train. Impeller 58 is mounted on a shaft 70 which constitutes an extension of shaft 28 and which rotates with shaft 28 and gear 20 to drive impeller 58.

The elements including conduit 52, inducer impeller pump 54, conduit 56, impeller pump 58, conduit 60, and conduit 64 leading to discharge port 50 constitutes a second flow circuit for fuel to be delivered to the engine. The second flow circuit is inactive on engine start up in that it is not delivering fuel to discharge port 50. This inactive state of the second circuit results from a combination of factors: check valve 62 is closed during engine start up, there is no fuel in the conduits of the second circuit at the initial stages of start up since the impeller pumps do not have dry lift capability, and conduit 60 may be vented by a vent valve 72, the structure and operation of which will be described in detail hereinafter.

As engine operation proceeds from start up to the normal operating range, the high dry lift capability of gear pump 18 eventually causes inlet port 10 to flood so that the conduits and pumps in the second circuit begin to fill with fluid up to check valve 62, and pressure begins to develop in the second pumping circuit. Simultaneously, the discharge pressure at pump 18 is rising, and the level of the discharge pressure from pump 18 is employed as an actuating signal to eventually actuate selector valve 14 to cause the activation of the second pumping circuit and the deactivation of the first pumping circuit. The manner in which the change from the first pumping circuit to the second pumping circuit is accomplished can best be understood by referring at this time to FIGS. 2 and 3 wherein the details of the structure and operation of selector valve 14 are shown.

Referring first to FIG. 2, selector valve 14 is shown with the elements positioned to connect conduit 12 to conduit 16 and conduit 38 to conduit 46 when the first pumping circuit is activated. Selector valve 14 includes a housing designated as 11 which, as stated above, may be part of a single unitary housing for the entire structure of the present invention or which may be a separate housing for the selector valve. An elongated bore 74 extends through most of the central portion of housing 11, and a ported sleeve 76 is located within bore 74 in a fixed position. Sleeve 76 has radially directed ports 78, 80, 82, 84, 86, 88, 90, 92 and 94 leading to the interior thereof. A slidable spool valve 96 is positioned within sleeve 76, spool valve 96 having annular lands 98, 100 and 102 and a series of four annular grooves or recesses 104, 106, 108 and 110, grooves 106 and 108 being located at intermediate portions of valve 96, and grooves 104 and 110 being at terminal portions of valve 96. Leftward movement of valve 96 is limited by an end cap 112 which is fastened to housing 11 and against which an annular projection 114 butts when valve 96 is in its leftward most position. The limit of rightward movement of valve 96 is determined by a shoulder 116 against which an annular projection 118 butts when the valve is in the rightward most position. A helical compression spring 120 extends from casing 11 to spool valve 96 to load spool valve leftwardly and urge it to the position shown in FIG. 2 wherein leftward movement is limited by the contact of projection 114 with end cap 112. The peripheral portions of ported sleeve 76 in contact with housing 11 have a series of annular sealing elements such as O rings 122, 124, 126, 128, 130 and 132.

As previously noted, the elements of selector valve 14 are in the position shown in FIG. 2 on engine start up when the first pump circuit is active so that gear pump 18 is supplying fuel to discharge port 50. With the elements positioned as shown in FIG. 2, fuel from conduit 12 enters a chamber 134 having an annular section communicating with ports 86 and 94, and the fuel flows through ports 86 and 94 and then via groove 108 which serves as a transfer passage to deliver the fuel to ports 84 and 92. Ports 84 and 92 are in turn in full communication with an annular section of a chamber 136, and chamber 136 is connected to conduit 16. The fuel thus enters selector 14 via conduit 12 and is transferred, via chamber 134, ports 86 and 94, groove 108, ports 84 and 92, and chamber 136, to conduit 16 where it then flows to gear pump 18.

The fuel discharged from pump 18 is delivered via conduit 38 and restricted branch passageway 42 (see FIG. 1) to bore 32 to load sealing block piston 30, and the pressurized fuel is also delivered via conduit 44 to chamber 137 where it assists spring 120 in loading spool valve 96 toward the left. Of course, the main discharge flow from pump 18 is delivered via conduit 38 and through selector valve 14 to conduits 46 and 48 and then to discharge port 50. The pressurized fuel in conduit 38 enters a chamber 138 in selector valve 11 from which it is delivered, via an annular segment, through ports 80 and 88 to annular groove 106. From annular groove 106, the fuel passes through ports 82 and 90 to an annular segment of a chamber 140. The fuel then flows to conduit 46 connected to chamber 140 and then on to conduit 48 and discharge port 50. Thus, the pressurized pump discharge fuel in conduit 38 is delivered to selector valve 14 and transferred to conduit 46 via chamber 138, ports 80 and 88, groove 106, ports 90 and 82, and chamber 140.

Still referring to FIG. 2, the pressurized fuel in annular groove 106 is also delivered via transverse passageways 142 to a central bore 144, and bore 144 is connected via a transverse end passageway 146 to annular groove 104. A slidable pilot piston 148 is located in a central axially disposed bore 150 of spool valve 96, bore 150 being smaller in diameter than bore 144. Pilot piston 148 is retained in bore 150 by a snap ring 152 positioned at one end of bore 150. A stem 154 integral with piston 148 extends from one end of the piston through a restricted opening 156 where it contacts a ball valve 158. Ball valve 158 is loaded to the left by a spring 160 which causes it to seat against and close opening 156. Spring 160 is retained by a snap ring 160 which also serves to position and retain a stem 164 which serves as a travel limiter for ball 158.

As the discharge pressure from pump 18 increases, the fluid pressure in bore 144, which receive pump discharge pressure via transverse passageways 142, also increases, and this increased pressure is delivered, via transverse passageway 146, to annular groove 104 to load spool valve 96 to the right. However, this rightward force is opposed by the leftward force of spring 120 and the leftward pressure loading on the end of spool valve 96 by the fluid in chamber 137. The pressurized fluid in chamber 144 also bears against the leftward end of pilot piston 148 and urges pilot piston 148 to the right. When the pump discharge pressure reaches a sufficiently high level, the pressure of the fluid in bore 144 becomes sufficient to move pilot piston 148 to the right overcoming the loading of spring 160 as transmitted through ball 158 and stem 154. The rightward movement of pilot piston 148 results in stem 154 moving ball 158 to the right to unseat the ball and allow fluid flow through opening 156. One side of opening 156 is connected via a passageway 166 to chamber 137, and the other side of opening 156 is connected via a passageway 168 to annular groove 108 and thus to inlet pressure. The unseating of ball valve 158 results in chamber 137 being connected via passageway 166, opening 156, passageway 168, and annular groove 108 to pump inlet pressure thereby venting chamber 137. The venting of chamber 137 then allows the rightwardly directed load on spool valve 96 to overcome spring 120 and move valve 96 to the right to assume the position shown in FIG. 3.

Referring now to FIG. 3, wherein spool valve 96 is shown shifted fully to the right so that projection 118 is in contact with shoulder 116, land 100 of the valve spool is blocking the entrance to port 92 and chamber 136. Thus, the flow of fuel from fuel inlet conduit 10 to pump inlet conduit 16 is terminated. Similarly, land 98 blocks port 88 in chamber 138 so that the pump discharge flow from conduit 38 to conduit 46 is terminated. Land 98 also uncovers port 78 and brings annular groove 104 into registry with port 78 so that conduit 46 is connected to port 78 via chamber 140, port 82, groove 106, passageway 142, bore 144 and passageway 146. Port 78 is in turn connected to a conduit 172.

Referring again to FIG. 1, the termination of fuel flow to and from gear pump 18 reduces the back pressure delivered to the spring side of check valve 62 via branch conduits 48 and 64. As pointed out above, inlet 10 has become flooded by this time and the second pumping circuit has filled with fluid up to check valve 62, and pressure has developed in conduit 60. The reduction in back pressure on the spring side of check valve 62 allows the pressure in conduit 60 to drive check valve 62 downward against the spring force so that conduit 60 is connected to conduit 64 and thence to discharge port 50. Accordingly, the second pumping circuit having impeller pumps 54 and 58 has become activated to supply fuel to discharge port 50 for the normal range of engine operation, and the first pumping circuit with its gear pump has become deactivated.

Upon the deactivation of the first pumping circuit it becomes desirable to disengage the sealing block 24 from gears 20 and 22 so that the gears can function as part of the gear drive mechanism for impeller pumps 54 and 58 without encountering the friction and wear associated with the sealing block engagement. To that end, the left side of sealing block piston 30 is loaded with discharge pressure reflected from discharge 50 via conduit 48 and branch conduit 174. Recalling that conduit 44 is now connected through chamber 137 of valve 14 to inlet 12, the flow restriction 42 in conduit 40 provides a pressure reduction on the spring side (right side) of piston 30 so that the discharge pressure loading on the left side thereof forces piston 30 to the right against spring 34 and thus retracts sealing block 24 from engagement with gears 20 and 22. Mechanical friction losses and wear normally associated with sealing engagement are thus eliminated when the gears are not functioning in the pumping mode.

To further eliminate losses, provisions are made to drain the gear pump cavity when the gears are not functioning in a pumping mode and also to provide a cooling and lubricating spray when the gears are functioning as a drive train for the impellers of the second pumping circuit. To that end, fluid and discharge pressure from the second pumping circuit flows through conduit 48 and conduit 46 in the reverse direction to the direction indicated by the arrows in those conduits for flow during activation of the first pumping circuit. This reverse flow is delivered to chamber 140 of selector valve 14 and then flow through selector valve 14 via port 82, annular groove 106, passageways 142 and bore 144 through the open end of bore 144 to port 78 and thence to chamber 170 and conduit 172. Referring again to FIG. 1, conduit 172 has first, second and third branches 176, 178 and 180, respectively. Each of the branch conduits has a terminal nozzle 182, 184, and 186, respectively. Nozzle 182 discharges into a venturi section 188 which is joined transversely by an induced flow conduit 190 to form a jet eductor pump. Conduit 190 is connected to gear pump cavity 26, and the connection of conduit 190 to low-pressure venturi throat region 188 induces flow in conduit 190 to drain the formerly flooded gear cavity 26. At the same time, a fluid mist is directed via nozzles 184 and 186 respectively of conduits 178 and 180 to the intermesh regions of gears 68 and 22 and gears 22 and 20. The gears are thus cooled and lubricated and the gear cavity is drained to eliminate cavity flooding when the gears are being operated in the gear train drive mode rather than in the pump mode. The combined inducing and induced flow from the venturi section 188 is delivered to a conduit 192, and from there it flows through a part of conduit 12 back to inlet 10.

In the event the aircraft goes into a high altitude cruise mode of operation, a third pumping circuit having a low flow vapor core centrifugal pump is activated and the second pumping circuit is deactivated. Referring once again to FIG. 1, the third pumping circuit includes a conduit 194, a centrifugal pump unit indicated generally at 196, a conduit 198, a spring loaded check valve 200, and a branch conduit 202 leading to discharge port 50. Check valve 200 is normally closed during the operation of the first and second pumping circuits to shut off conduit 198 from conduit 202. In addition, a spring loaded valve 204 normally closes off conduit 194 from inlet 10 so that there is no flow in the third pumping circuit. When the aircraft enters a high altitude cruise mode, an external signal, which may be from any desired source such as atmosphere sensing mechanism, is delivered via a signal conduit 206 to a piston 208 connected to valve 204. The signal in conduit 206 loads piston 200 against the spring load of valve 204 and drives valve 204 to a position where it seats against the inlet to conduit 52 to close off the inlet to the second pumping circuit and opens conduit 194 to inlet 10. Thus, the second pumping circuit is deactivated and the third circuit is activated. The fuel then flows via conduit 194 to pumping unit 196 which is a vapor core pump including an axial inducer 210 and an impeller 212 connected together for rotation. Impeller 212 is mounted on an extension of shaft 70 so that it is driven by input shaft 28. The vapor core pump also includes a peripheral slotted window-type vapor core valve 214 surrounding the eye of the axial inducer. The position of vapor core valve 214 is controlled by movement of a linkage 216 responsive to movement of a spring loaded piston 218 housed in a cylinder 220 and actuated by a signal pressure delivered via a conduit 222. The construction and operation of vapor core pumps and valves are described in great detail in the following United States patents issued to S. R. Tyler: 3,265,000; 3,142,259; 3,128,822; and 3,106,165. Reference is hereby made to these patents for a more detailed discussion of vapor core pumps and valves. The discharge from impeller 212 is delivered via conduit 198 to check valve 200. Since, as stated above, the inlet to conduit 52 of the second pumping circuit is closed upon the actuation of valve 204, the back pressure from discharge 50 behind check valve 200 is reduced, and the pressure in conduit 198 is sufficient to overcome the spring force behind valve 200. Thus, valve 200 is driven downward against the force of the spring and conduit 198 is connected to conduit 202 and thence to discharge port 50 so that the third pumping circuit is fully activated and delivers fuel to discharge port 50 for metered delivery to the engine.

In the event the mode of engine operation again changes from high altitude cruise to a normal operating range, the signal pressure in conduit 206 will be removed, valve 204 will return to its normally closed position wherein conduit 194 is disconnected from inlet 10 and conduit 52 is connected to inlet 10, and the third pumping circuit will become deactivated and the second pumping circuit will become reactivated.

Referring now to FIG. 4, the details of vent valve 72 are shown. As noted above, vent valve 72 insures that either of the second or third pumping circuits is vented when it is deactivated and the other pumping circuit is activated. Vent valve 72 includes a housing or casing which, as previously discussed with respect to other elements of the system may be part of the general casing 11 or a separate casing. Housing 11 has an elongated central bore 224, and an end cover 226 is fixed in sealing engagement with the bore by any convenient fastening means. End cover 226 has a central threaded bore with a threaded stem 228 one end of which extends into bore 224 and the other end of which extends externally of housing 11 and has any convenient external adjustment means 230 to permit adjustment of the penetration of the stem into bore 224, to lock the stem in a selected adjusted position, and to seal against fluid leakage along the stem. A similar axially aligned stem 232 extends into bore 224 on the opposite side of housing 11 and also extends externally of housing 11 and has external adjustment, locking and sealing means 234 associated therewith. A shuttle piston assembly comprising a pair of axially slidable valve seat members 236 and 238 and a perforated annular sleeve 240 disposed therebetween, is adapted to move in either direction along the axis of bore 224 to either one of two extreme positions in response to a pressure difference across the end faces of the piston assembly. Perpiheral sealing means 242 and 244 on valve seats 236 and 238 permit bore 224 to be divided into three fluid tight chambers 246, 248 and 250. A pair of ball valves 252 and 254 are positioned within chamber 248, the balls being loaded apart into sealing engagement with the valve seats 236 and 238 by a spring 256 acting through a pair of ball retainers 258 and 260. Both ball valves can be simultaneously seated only when the entire piston assembly is axially centered. End chamber 246 is connected via conduit 262 to the discharge pressure from pump 58 in conduit 60 (see also FIG. 1), and end chamber 250 is connected via conduit 264 to the discharge pressure of pump 212 in conduit 198. The center chamber 248 is in full communication with gear cavity 26 via conduit 266. At start up and during normal engine operation, the pressure in chamber 246 exceeds the pressure in chamber 250 since the inlet flow to impeller pump 212 is blocked by valve 204. Hence, the entire piston assembly of vent valve 72 is shifted to the right of center by the pressure loading on valve seat element 236, and ball 254 is unseated from contact with valve seat 238. The unseating ball 254 provides a fluid connection path from pump 212 via conduit 198, conduit 264, chamber 250, and chamber 248 to vent conduit 266 thus venting pump 212 to the gear cavity for draining by the eductor action discussed above. Similarly, at high altitude cruise, valve 204 blocks flows to conduit 52 and the second pump circuit and permits pump 212 to pressurize conduit 198, thereby shifting the entire piston assembly of valve 72 to the left whereby valve 254 is seated, valve 252 is unseated and pump 58 is vented via condiut 60, conduit 262, chamber 246, chamber 248, and conduit 266 to pump cavity 26 for draining by the eductor. The venting of each of the second and third pumping circuits through vent valve 72 when the other circuit is active eliminates wind milling losses which might otherwise be encountered in the inactive pumping circuit.

By way of general comment, the principal flow paths through the first, second and third pumping circuits are indicated in FIG. 1 by the solid flow arrows, the broken flow arrows, and the dotted flow arrows, respectively. Furthermore, it will be understood that the check valves 62 and 200 in each of the second and third flow circuits are always closed when the respective flow circuit is inactive and is open when the respective flow circuit is active. Whenever a switch is made from one flow circuit to the other, the back pressure behind the closed check valve drops to allow the check valve to open, and the pressure upstream of the previously opened check valve drops so that the previously opened check valve moves to a closed position.

It should be apparent that in the event an inducer is felt unnecessary for the high flow centrifugal pump removal of such would be covered by the scope of this invention. Moreover, appropriate rescheduling of the valving would allow the low flow element to induce the high flow element through use of a jet eductor principle which is well known in the state of the art of pump technology.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A fluid pumping system for delivering fluid to a fluid consuming load, the system including:
   a first pumping circuit, said first pumping circuit having positive displacement pump means, and said first pumping circuit being operative over a first range of operation of the fluid consuming load;
   a second pumping circuit, said second pumping circuit having centrifugal pump means, and said second pumping circuit being operative over a second range of operation of the fluid consuming load;
   means for activating said first pumping circiut and deaitivating said second pumping circuit and the cencentrifugal pump means during said first range of operation of the fluid consuming load;
   selector means for selectively switching from said first pumping circuit to said second pumping circuit to activate said second pumping circuit and deactivate said first pumping circuit; and
   drive means connected between said positive displacement pump means of said first pumping circuit and said centrifugal pump means of said second pumping circuit, said positive displacement pump means constituting a drive for said centrifugal pump means upon deactivation of said first pumping circuit and activation of said second pumping circuit.

2. A fluid pumping system as in claim 1 including:
   a third pumping circuit, said third pumping circuit having centrifugal pumping means, and said third pumping circuit being operative over a third range of operation of the fluid consuming load;
   means for deactivating said third pumping circuit during said first and second ranges of operation of the fluid consuming load; and
   switching means for selectively switching between said second pumping circuit and said third pumping circuit.

3. A fluid pumping system as in claim 2 including:
   drive means connected between said positive displacement pump means of said first pumping circuit and said centrifugal pump means of said third pumping circuit, said positive displacement pump means constituting a drive for said centrifugal pump means of said third pumping circuit upon deactivation of said second pumping circuit and activation of said third pumping circuit.

4. A fluid pumping system as in claim 2 wherein:
   said first, second and third pumping circuits are connected in parallel flow relationship between a common inlet and a common outlet for the circuits.

5. A fluid pumping system as in claim 1 including:
   means for unloading said positive displacement pump means of said first pumping circuit upon deactivation of said first pumping circuit; and
   means for lubricating said positive displacement pump means when constituting a drive for said centrifugal pump means upon activation of said second pumping circuit.

6. A fluid pumping system as in claim 5 wherein:
   said unloading means includes means for draining said positive displacement pump means.

7. A fluid pumping system as in claim 5 wherein:
   said lubricating means includes means for spraying said positive displacement pump means with part of the fluid to be pumped.

8. A fluid pumping system as in claim 5 wherein:
   said unloading means includes eductor means connected to drain said positive displacement pump means.

9. A fluid pumping system as in claim 8 wherein:
   said eductor means is connected to receive part of the discharge from said second pumping circuit as the driving fluid for said eductor.

10. A fluid pumping system as in claim 9 wherein:
    said eductor means is connected to said selector means, said selector means being connected to deliver part of the discharge from said second pumping circuit to said eductor means upon switching of said selector means to activate said second pumping circuit and deactivate said first pumping circuit.

11. A fluid pumping system as in claim 1 wherein:
    said selector means is switched in response to pressure in said first pumping circuit.

12. A fluid pumping system as in claim 11 wherein:
    said pressure is discharged pressure from said positive displacement pump.

13. A fluid pumping system for deliverng fluid to a fluid consuming load, the system including:
    a first pumping circuit, said first pumping circuit having positive displacement pump means, and said first pumping circuit being operative over a first range of operation of the fluid consuming load;
    a second pumping circuit, said second pumping circuit having centrifugal pump means, and said second pumping circuit being operative over a second range of operation of the fluid consuming load;
    a third pumping circuit, said third pumping circuit having centrifugal pump means, and said third pumping circuit being operative over a third range of operation of the fluid consuming load;
    means for activating one of said first, second and third pumping circuits and deactivating the other two of said pumping circuits during activation of said one pumping circuit;
    selector means for selectively switching from said first pumping circuit to said second pumping circuit;
    switching means for selectively switching between said second pumping circuit and said third pumping circuit;
    drive means extending between said positive displacement pump means of said first pumping circuit and said centrifugal pump means of said second pumping circuit; and
    drive means extending between said positive displacement pump means of said first pumping circuit and said centrifugal pump means of said third pumping circuit;

said positive displacement pump means constituting a drive for said centrifugal pump means of said second and third pumping circuits upon deactivation of said first pumping circuit.

14. A fluid pumping system as in claim 13 wherein: said positive displacement pump means is a gear pump.

15. A fluid pumping system as in claim 14 wherein: said drive means between said gear pump means and said centrifugal pump means of said second and third pumping circuits includes means connecting said centrifugal pump means to gears of said gear pump.

16. A fluid pumping system as in claim 14 including: means for unloading said positive displacement pump means of said first pumping circuit upon deactivation of said first pumping circuit; and
means for lubricating said positive displacement pump means when constituting a drive for said centrifugal pump means of said second and third pumping circuits.

17. A fluid pumping system as in claim 16 wherein: said unloading means includes means for draining said positive displacement pump means.

18. A fluid pumping system as in claim 17 wherein: said lubricating means includes means for spraying said positive displacement pump means with part of the fluid to be pumped.

19. A fluid pumping system as in claim 18 wherein: said unloading means includes eductor means connected to drain said positive displacement pump means.

20. A fluid pumping system as in claim 19 wherein: said eductor means is connected to receive part of the discharge from either of said second or third pumping circuits as the driving fluid for said eductor.

21. A fluid pumping system as in claim 20 wherein: said eductor means is connected to said selector means, said selector means being connected to deliver part of the discharge from said second pumping circuit to said eductor means upon switching of said selector means to activate said second pumping circuit and deactivate said first pumping circuit.

22. A fluid pumping system as in claim 21 wherein: said selector means is switched in response to pressure in said first pumping circuit.

23. A fluid pumping system as in claim 22 wherein: said pressure is discharge pressure from said positive displacement pump.

24. A fluid pumping system as in claim 16 including: drain means connected to said second and third pumping circuits to drain one of said circuits when the other is activated.

25. A fluid pumping system as in claim 24 wherein: said drain means includes valve means operable in response to pressure in said second and third pumping circuits to connect one of said circuits to drain when the other is activated.

26. A fluid pumping system as in claim 25 wherein: said unloading means and said drain means include eductor means connected to said positive displacement pump and to said valve means.

27. A fluid pumping system for delivering fluid from a supply source to a fluid consuming load at increased pressures comprising:
a first pumping circuit, said first pumping circuit having positive displacement pump means for providing the increased pressures between the supply source and the fluid consuming load, and said first pumping circuit being operative over a first range of operation of the fluid consuming load;
a second pumping circuit, said second pumping circuit having a centrifugal pump means for providing the increased pressures between the supply source and the fluid consuming load, and said second pumping circuit being operative over a second range of operation of the fluid consuming load;
means for activating said first pumping circuit and deactivating said second pumping circuit and centrifugal pump means during first range of operation of the fluid consuming load;
selector means for selectively switching from said first pumping circuit and the positive displacement pump means to said second pumping circuit and the centrifugal pump means to activate said second pumping circuit and deactivate said first pumping circuit during said range of operation of the fluid consuming load; and
means connected to said selector means and the first pumping circuit for draining fluid from the positive displacement pump means during said second range of operation of the fluid consuming load.

References Cited

UNITED STATES PATENTS

| | | | |
|---|---|---|---|
| 1,083,329 | 11/1914 | Lancia | 103—126 |
| 2,767,658 | 10/1956 | Murray | 103—126 |
| 3,011,308 | 12/1961 | Wotring | 103—11 |
| 3,026,929 | 3/1962 | Burns | 60—39.28 |
| 3,068,795 | 12/1962 | Lauck | 103—11 |
| 3,105,441 | 10/1963 | Grill et al. | 103—11 |

WILLIAM L. FREEH, Primary Examiner

U.S. Cl. X.R.

417—202, 205, 216, 228, 253, 288, 295, 311

UNITED STATES PATENT OFFICE
CERTIFICATE OF CORRECTION

Patent No. 3,547,557                    Dated December 15, 1970

Inventor(s) Charles W. Grennan and Richard J. Hearn

It is certified that error appears in the above-identified patent and that said Letters Patent are hereby corrected as shown below:

IN THE SPECIFICATION:
Column 4, line 10, change "life" to --lift--
Column 8, line 65, after "unseating" insert --of--
Column 8, line 70, change "flows" to --flow--

IN THE CLAIMS:
Claim 1, line 12 (column 9, line 45) cancel "cen-"
Claim 27, line 17 (column 12, line 24) after "and" insert --the--
Claim 27, line 25 (column 12, line 32) after "said" inser --second--

SIGNED AND
SEALED
MAR 16 1971

(SEAL)
Attest:

Edward M. Fletcher, Jr.
Attesting Officer

WILLIAM E. SCHUYLER, JR.
Commissioner of Patents